United States Patent
Manicone

(10) Patent No.: US 10,267,175 B2
(45) Date of Patent: Apr. 23, 2019

(54) HYDRAULIC POWER RECOVERY TURBINE WITH INTEGRATED BEARING-CLUTCH HOUSING

(71) Applicant: Nuovo Pignone Srl, Florence (IT)

(72) Inventor: Pasquale Delio Manicone, Bari (IT)

(73) Assignee: Nuovo Pignon SRL, Florence (IT)

( * ) Notice: Subject to any disclaimer, the term of this patent is extended or adjusted under 35 U.S.C. 154(b) by 208 days.

(21) Appl. No.: 15/028,046

(22) PCT Filed: Oct. 2, 2014

(86) PCT No.: PCT/EP2014/071196
§ 371 (c)(1),
(2) Date: Apr. 8, 2016

(87) PCT Pub. No.: WO2015/052081
PCT Pub. Date: Apr. 16, 2015

(65) Prior Publication Data
US 2016/0237843 A1    Aug. 18, 2016

(30) Foreign Application Priority Data

Oct. 10, 2013  (IT) ................ FI2013A0234

(51) Int. Cl.
*F01D 15/08*    (2006.01)
*F03B 13/06*    (2006.01)
(Continued)

(52) U.S. Cl.
CPC ............ *F01D 15/08* (2013.01); *F01D 5/02* (2013.01); *F03B 11/02* (2013.01); *F03B 11/06* (2013.01);
(Continued)

(58) Field of Classification Search
CPC .. F01D 15/08; F01D 5/02; F03B 11/06; F05B 2240/60; F05B 2260/4023; F04D 13/04
See application file for complete search history.

(56) References Cited

U.S. PATENT DOCUMENTS 2,590,472 A * 3/1952 Soper ................. F16H 47/06
                                                        475/43
2,676,497 A * 4/1954 Ahlen ................ F16H 47/06
                                                        192/3.24
(Continued)

FOREIGN PATENT DOCUMENTS

CN    101713412 A    5/2010
CN    102589343 A    7/2012
(Continued)

OTHER PUBLICATIONS

Machine English translation of DE 1258810.*
(Continued)

*Primary Examiner* — Mark A Laurenzi
*Assistant Examiner* — Shafiq Mian
(74) *Attorney, Agent, or Firm* — GE Global Patent Operation; Marc A. Vivenzio

(57) ABSTRACT

The hydraulic power recovery turbine comprises a casing and a rotor arranged for rotation in the casing. The rotor comprises a rotor shaft and at least one impeller mounted on the rotor shaft. The rotor shaft is supported by bearings arranged in respective bearing housings. The drive-end bearing housing further houses a clutch, which connects the rotor shaft to an output shaft of the hydraulic power recovery turbine extending from the drive-end bearing housing.

16 Claims, 4 Drawing Sheets

(51) Int. Cl.
*F16D 23/10* (2006.01)
*F01D 5/02* (2006.01)
*F03B 11/02* (2006.01)
*F03B 11/06* (2006.01)
*F04D 13/04* (2006.01)
*F04D 1/00* (2006.01)
*F16D 43/04* (2006.01)

(52) U.S. Cl.
CPC .............. *F03B 13/06* (2013.01); *F04D 13/04* (2013.01); *F16D 23/10* (2013.01); *F04D 1/00* (2013.01); *F05B 2220/70* (2013.01); *F05B 2240/60* (2013.01); *F05B 2260/40* (2013.01); *F05B 2260/4023* (2013.01); *F05B 2260/98* (2013.01); *F16D 43/04* (2013.01); *Y02E 10/22* (2013.01); *Y02E 10/226* (2013.01); *Y02E 10/28* (2013.01); *Y02E 60/17* (2013.01); *Y02P 90/50* (2015.11)

(56) References Cited

U.S. PATENT DOCUMENTS

| | | | | |
|---|---|---|---|---|
| 7,093,703 B2* | 8/2006 | Ikeda | ................... | F16C 41/001 |
| | | | | 192/110 B |
| 9,217,500 B2* | 12/2015 | Ludas | ................... | F16H 47/08 |
| | | | | 415/200 |
| 9,576,686 B2* | 2/2017 | Fortino | ................. | G21C 15/25 |
| | | | | 415/104 |
| 9,964,113 B2* | 5/2018 | Westberg | ............. | E21B 43/128 |
| | | | | 415/104 |
| 2009/0257863 A1* | 10/2009 | Prioreschi | ............ | F03B 13/264 |
| | | | | 415/200 |
| 2010/0254814 A1* | 10/2010 | Bouvet | .................... | F03B 1/02 |
| | | | | 416/197 B |
| 2010/0272555 A1* | 10/2010 | Bouvet | .................... | F03B 3/02 |
| | | | | 415/104 |
| 2013/0022456 A1* | 1/2013 | Lehoczky | ................ | F03B 3/04 |
| | | | | 415/208.2 |
| 2014/0219592 A1* | 8/2014 | Mathieu | ................. | F16C 17/03 |
| | | | | 384/257 |
| 2015/0285089 A1* | 10/2015 | Scarponi | ................ | F01D 15/08 |
| | | | | 60/772 |

FOREIGN PATENT DOCUMENTS

| | | | | |
|---|---|---|---|---|
| CN | 102748988 A | | 10/2012 | |
| CN | 202726176 U | | 2/2013 | |
| DE | 506122 C | | 8/1930 | |
| DE | 1258810 B | * | 1/1968 | .............. F03B 13/06 |
| FR | 1553567 A | | 1/1969 | |
| GB | 1342709 A | | 1/1974 | |

OTHER PUBLICATIONS

Italian Search Report and Written Opinion issued in connection with corresponding IT Application No. FI2013A000234 dated Jun. 10, 2014.

International Search Report and Written Opinion issued in connection with corresponding PCT Application No. PCT/EP2014/071196 dated Dec. 22, 2014.

First Office Action and Search Report issued in connection with corresponding CN Application No. 201480055706.6 dated May 25, 2017.

* cited by examiner

STATE OF THE ART

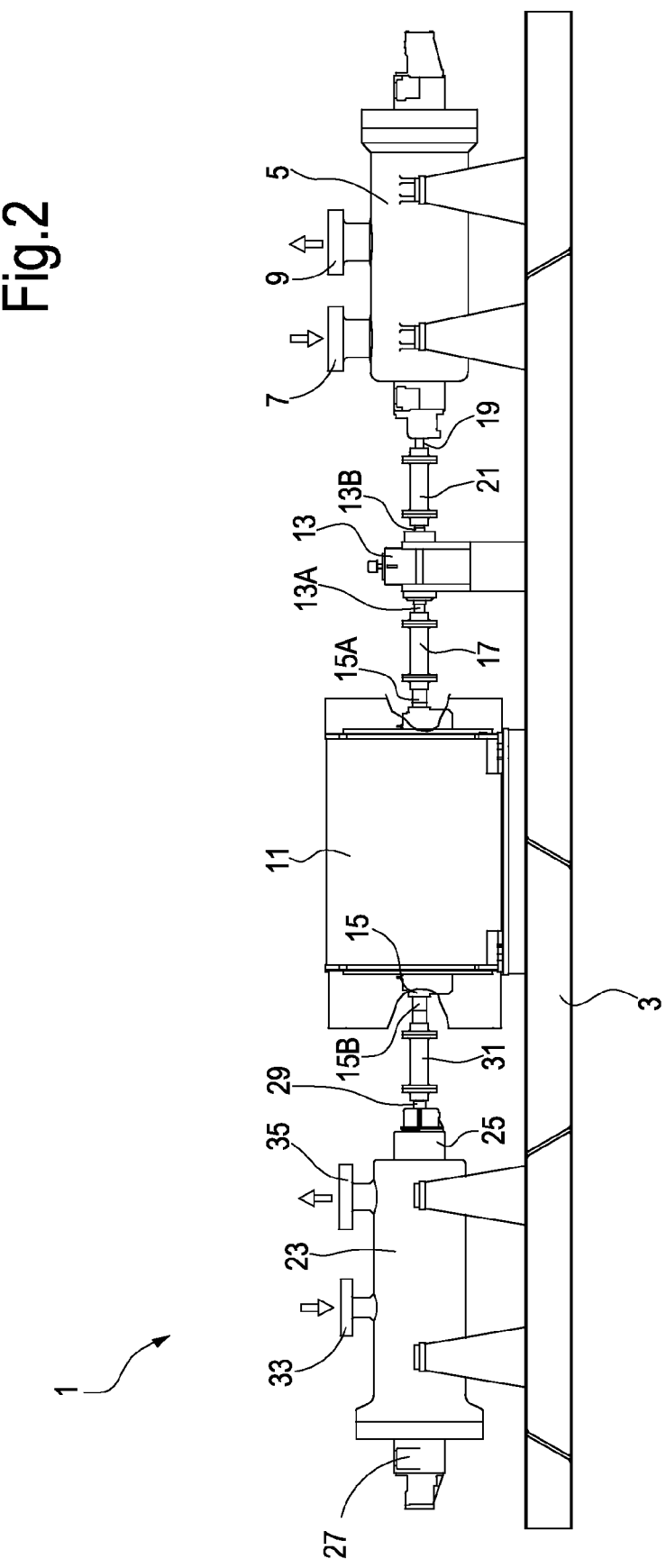

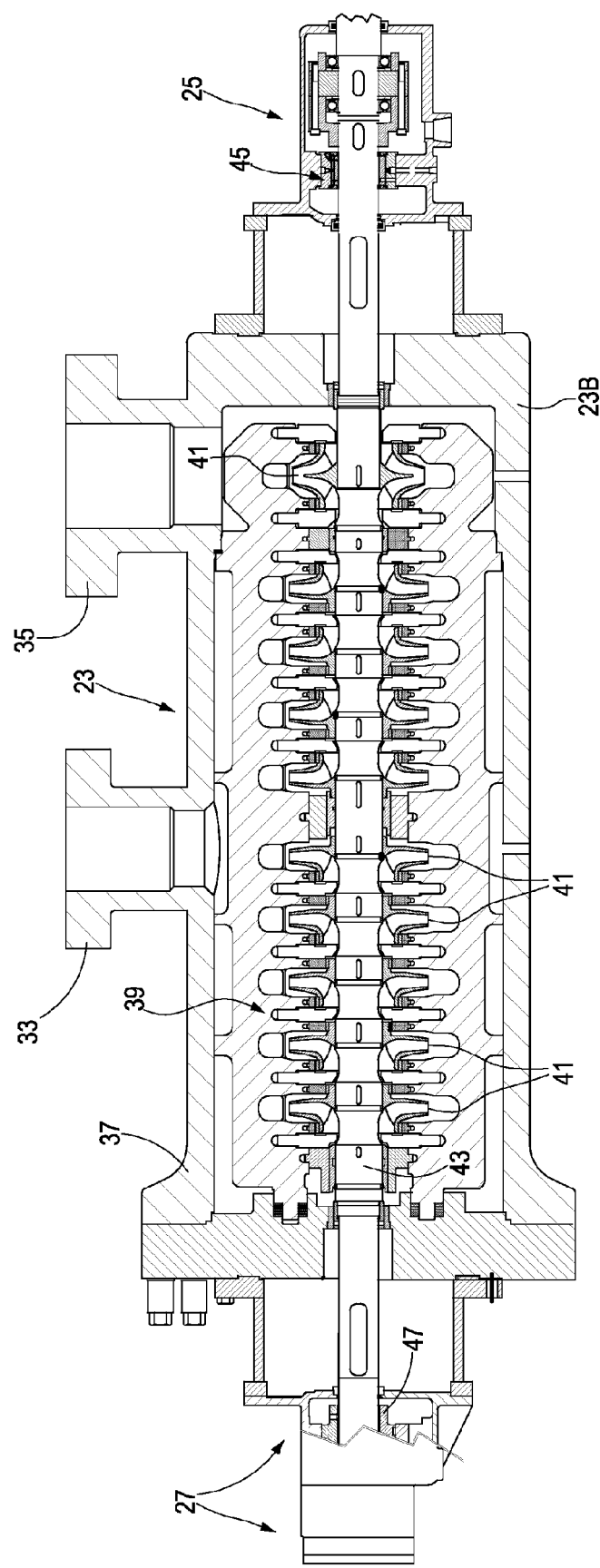

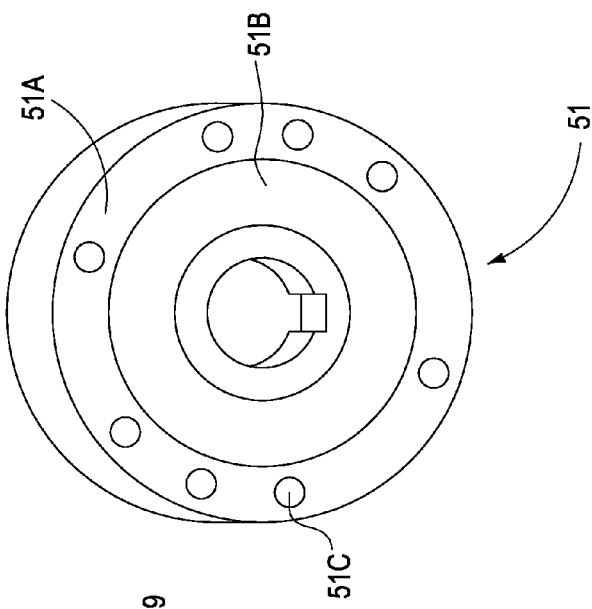
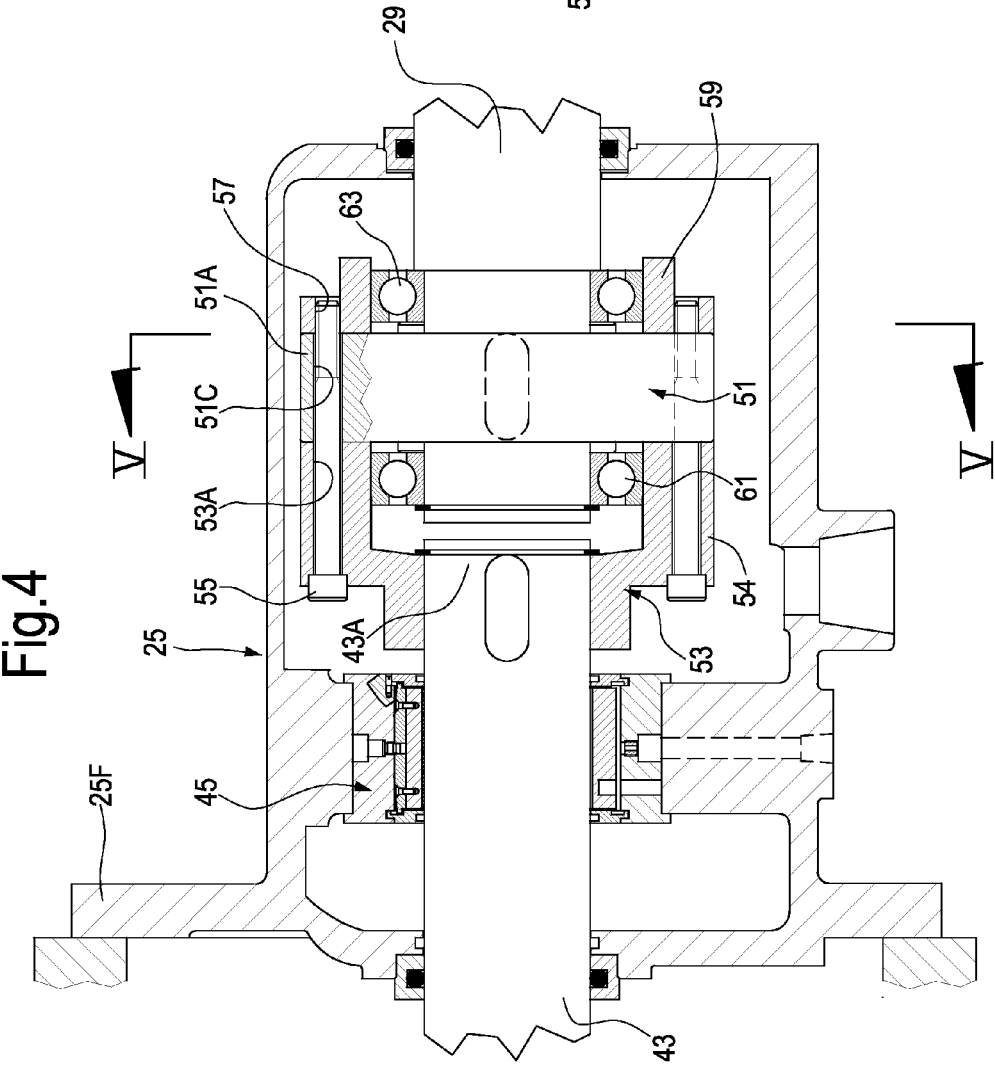

HYDRAULIC POWER RECOVERY TURBINE WITH INTEGRATED BEARING-CLUTCH HOUSING

BACKGROUND

Embodiments of the subject matter disclosed herein generally relate to hydraulic power recovery turbine systems. More specifically, the present disclosure concerns improvements in the bearing/clutch arrangement connecting the hydraulic power recovery turbine to an electric motor, a centrifugal pump, or a rotary equipment in general.

Concerns on the environmental impact of energy production and consumption are fostering the research for improving the energy efficiency of industrial plants, systems and processes in various ways. In many industrial plants, energy is available e.g. in the form of waste heat, pressure energy or fluid head or the like. In recent years efforts have been made to exploit this kind of energy which was previously simply dissipated.

Hydraulic power recovery turbines are used in several installations, plants and systems for recovering energy from a flow of pressurized liquid. Generally speaking, a hydraulic power recovery turbine is a machine used to recover power from a liquid stream by reducing the pressure thereof. A common type of hydraulic power recovery turbine is a reverse-rotating centrifugal pump that recovers power from a high pressure process liquid by reducing its pressure that will otherwise be wasted across throttle valves.

Traditionally, hydraulic power recovery turbines are used in plants where a large amount of fluid energy is dissipated in valves or other throttling devices. Power recovery is achieved using the fluid pressure and, more in general, a static head available in a plant, to drive the hydraulic power recovery turbine and obtaining useful mechanical power on the output shaft thereof. The power recovered by the hydraulic power recovery turbine is usually utilized to drive auxiliaries, such as a pump, or to reduce power absorbed from the electric grid, e.g. by supplementing mechanical energy to a driving shaft of an electric motor which drives a pump.

In some applications, the hydraulic power recovery turbine is utilized to drive an electric generator, thus converting the useful mechanical power available on the output shaft thereof into electric power.

For usefully exploiting pressure energy contained in high-pressure liquids, hydraulic power recovery turbines are often used in combination with electric motors, in order to exploit for example the power developed by a flow of liquid available in an industrial system. The power generated by the liquid flow is converted into mechanical power by the hydraulic power recovery turbine and the useful mechanical power available on the shaft of the hydraulic power recovery turbine is used for example to drive a load in combination with an electric motor.

FIG. 1 illustrates an installation according to the current art of a pump driven by an electric motor in combination with a hydraulic power recovery turbine, which is designed for recovering power from a fluid flow.

The system of FIG. 1, labeled 100 as a whole, comprises rotary equipment, for example a pump 101, which is driven into rotation by an electric motor 103. A pump shaft 101S is connected to a first end of a shaft 103S of the electric motor 103 through a gearbox 105. Joints, for example flexible shaft couplings 107, 109 can be provided between the gearbox 105 and the pump 101 and between the gearbox 105 and the first end of shaft 103S of the electric motor 103, respectively.

A second end of the electric motor shaft 103S is connected to a hydraulic power recovery turbine 111.

The connection between the hydraulic power recovery turbine 111 and the electric motor shaft 103S requires a clutch 113, which is housed in a housing 115 supported on a base plate 117, also supporting the remaining rotary machinery, namely the rotary equipment or rotary load 101, the electric motor 103 and the hydraulic power recovery turbine 111.

A first shaft coupling 119 is arranged between the electric motor shaft 103S and the clutch 113. A second shaft coupling 121 is arranged between the clutch 113 and a shaft 111S of the hydraulic power recovery turbine 111.

The hydraulic power recovery turbine 111 is provided with a turbine inlet 123 and a turbine outlet 125. The turbine inlet 123 and the turbine outlet 125 are connected to a hydraulic circuit (not shown), where through a fluid can flow. The hydraulic power recovery turbine 111 converts the power of the fluid flowing in the hydraulic circuit into useful mechanical power available on the turbine shaft 111S.

The operation of the system 100 is as follows. Under normal operating conditions, the electric motor 103 generates on the electric motor shaft 103S the entire mechanical power required for driving the rotary equipment 101 into rotation, for example for pumping a fluid which enters the pump 101 through a suction manifold 102 and is delivered by the pump 101 through a delivery manifold 104.

If a fluid flow is available in the hydraulic circuit connected to the turbine inlet 123 and the turbine outlet 125, the fluid flow is used for driving the hydraulic power recovery turbine 111 into rotation. When the rotary speed of the hydraulic power recovery turbine 111 becomes identical to the rotary speed of the electric motor 103, the clutch 113 is engaged, so that useful mechanical power can be delivered by the turbine shaft 111S to the electric motor shaft 103S. The mechanical power available from the hydraulic power recovery turbine 111 reduces the electric power consumed by the electric motor 103 for driving the rotary equipment 101.

The rotary machine arrangement provided on the baseplate 117 is particularly cumbersome and has a long footprint, in particular due to the quite large number of ancillary equipment arranged between each rotating machine 111, 103 and 101, in particular shaft couplings 107, 109, 119, 121, gearbox 105 and clutch 113.

SUMMARY OF THE INVENTION

According to one aspect, the subject matter disclosed herein is aimed at least partly alleviating the problems of the arrangements of the current art.

The footprint of an arrangement, including a prime mover or main driver, a rotary equipment and a hydraulic power recovery turbine, is reduced by integrating a clutch in the bearing housing of the hydraulic power recovery turbine. This arrangement removes the need for two separate shaft couplings between the hydraulic power recovery turbine and the main driver, reducing the overall length of the system.

According to some embodiments, a hydraulic power recovery turbine is provided, comprising: a casing; a rotor arranged for rotation in the casing, the rotor comprising a rotor shaft and at least one impeller mounted on the rotor shaft; at least one drive-end bearing housing and one non-drive-end bearing housing; at least one drive-end bearing and one non-drive-end bearing arranged in the two bearing housings and rotatingly supporting the rotor shaft. The drive end bearing housing comprising a mounting flange configured to connect the drive end bearing housing to the casing. A clutch is arranged in the drive-end bearing housing. The clutch connects the rotor shaft to an output shaft of the hydraulic power recovery turbine, which extends from the drive-end bearing housing for connection with the shaft of the main driver, e.g. an electric motor, or more generally to the shaft of a rotating equipment, for transmission of power thereto.

The impeller, or more particularly a plurality of impellers, are arranged in-between the bearings. In some embodiments the bearing housings are connected to a main body of a turbine casing, wherein the rotor of the hydraulic power recovery turbine is arranged, at opposite ends of the main body of the turbine casing.

In some applications, the output shaft of the hydraulic power recovery turbine is torsionally constrained to the shaft of the main driver or prime mover, e.g. an electric motor, and rotates at the same rotary speed as the main driver. The clutch is configured and controlled so that the clutch engages when the rotary speed of the hydraulic power recovery turbine reaches the rotary speed of the main driver. In an embodiment, the clutch is an overrunning clutch, which automatically engages when the two rotary speeds become identical. In this way, the hydraulic power recovery turbine starts transmitting mechanical power to the main driver shaft when the hydraulic power recovery turbine has reached the correct rotary speed.

By arranging the clutch in the bearing housing, a single lubrication system can be provided for lubricating the clutch and the drive-end bearing.

According to some embodiments, the clutch comprises an inner race and an outer race. One of the inner race and outer race of the clutch can be torsionally constrained to the rotor shaft and the other of the inner race and outer race can be connected to the output shaft of the hydraulic power recovery turbine. In some embodiments, the outer race is torsionally constrained to the rotor shaft of the hydraulic power recovery turbine and the inner race is torsionally constrained to the output shaft.

According to a further aspect, the present disclosure further concerns a rotary equipment driving arrangement including: a rotary equipment and a hydraulic power recovery turbine as described, which provides power for driving the rotary equipment, either alone or in combination with a prime mover or main driver, such as an electric motor.

According to some configurations, the rotary equipment can be an electric generator. The mechanical power recovered by the hydraulic power recovery turbine is thus converted into electric power. According to other configurations, the rotary equipment can include a load, such as a turbomachine, for example a rotary pump. In some embodiments, a rotary equipment driving arrangement is provided, comprising a hydraulic power recovery turbine, a prime mover, such as an electric motor, and a driven equipment, such as a rotating load. Mechanical power recovered by the hydraulic power recovery turbine is supplemented to the prime mover, e.g. by connecting the output shaft of the hydraulic power recovery turbine to a through shaft of an electric motor, arranged for driving the load into rotation. The electric power absorbed by the electric motor is thus reduced, as part of the mechanical power required for driving the load is provided by the hydraulic power recovery turbine.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 2 illustrates a system according to one embodiment of the present disclosure in a side view;

FIG. 3 illustrates a section along the rotation axis of a hydraulic power recovery turbine according to one embodiment of the present disclosure;

FIG. 4 illustrates an enlargement of the drive end side of the hydraulic power recovery turbine of FIG. 3;

FIG. 5 illustrates a view according to line V-V of FIG. 4.

DETAILED DESCRIPTION

Figure 1:
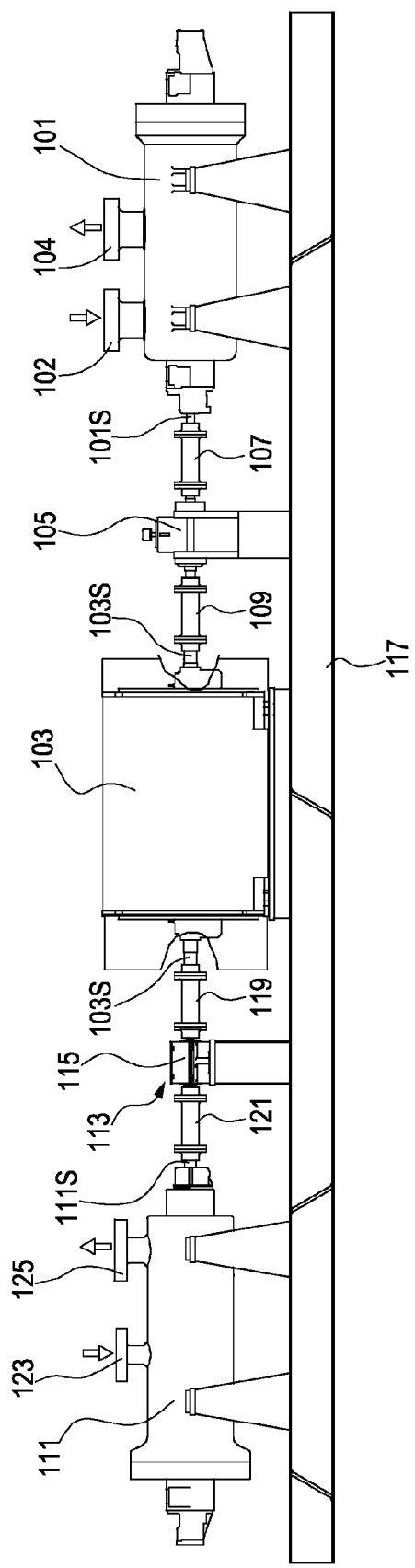
FIG. 1 illustrates a side view of a system according to the current art.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Referring to FIG. 2, the main components of a system according to the present disclosure will be described. The system, labeled 1 as a whole, comprises a baseplate 3, whereon the rotary machinery is arranged. In some embodiments, the system 1 comprises a driven rotary equipment 5. The driven rotary equipment 5 can be comprised of a hydraulic pump, for example a centrifugal pump. In other embodiments, the driven rotary equipment 5 can be comprised of a compressor or any other operating machine requiring a mechanical power to be operated. Here below reference will be made, by way of example only, to a centrifugal pump 5.

The centrifugal pump 5 comprises a suction manifold 7 and a delivery manifold 9 connected to a hydraulic circuit (not shown). Pump 5 can be driven into rotation by a main driver, or prime mover, e.g. an electric motor 11.

In some embodiments, a gearbox 13 is arranged between the electric motor 11 and the pump 5. The gearbox 13 can be used just for reversing the direction of rotation between an inlet shaft 13A and outlet shaft 13B of the gearbox 13, respectively. In other embodiments, the gearbox 13 can be used also to modify the rotary speed so that the pump 5 and the electric motor 11 can rotate at different speeds.

The electric motor 11 is comprised of an electric motor shaft 15 having a first end 15A and a second end 15B, projecting from the electric motor casing at opposite sides thereof. In some embodiments, the first end 15A of the electric motor shaft 15 can be connected to the inlet shaft 13A of the gearbox 13 through a shaft coupling 17.

The outlet shaft 13B of the gearbox 13 can be connected to a pump shaft 19 through a second shaft coupling 21.

The second end 15B of the electric motor shaft 15 is connected to a hydraulic power recovery turbine 23. As will be described in greater detail with respect to FIG. 3, the hydraulic power recovery turbine 23 can be a so called in-between bearings machine, comprised of a drive end bearing housing 25, wherein a first bearing supporting a turbine shaft and a clutch are arranged. The hydraulic power recovery turbine 23 can be further provided with a non-drive end bearing housing 27, wherein a second bearing supporting the turbine shaft is housed.

The hydraulic power recovery turbine 23 is further comprised of an output shaft 29, which is connected to the turbine shaft of the hydraulic power recovery turbine 23 in a manner which will be described in greater detail referring to FIGS. 3 and 4. The output shaft 29 projects from the drive-end bearing housing 25 for connection of the hydraulic power recovery turbine 23 with the electric motor shaft 15.

In some embodiments, a third shaft coupling 31 is arranged between the output shaft 29 and the end 15B of the electric motor shaft 15.

The hydraulic power recovery turbine 23 can be provided with an inlet manifold 33 and an outlet manifold 35. The turbine inlet manifold 33 and the turbine outlet manifold 35 are connected with a hydraulic circuit, not shown. A flow of fluid in the hydraulic circuit will thus pass through the hydraulic power recovery turbine 23 producing useful mechanical power, which is made available on the output shaft 29.

More details on the structure of the hydraulic power recovery turbine 23 are shown in FIG. 3. The hydraulic power recovery turbine 23 is known per se, and thus only the main components thereof will be described herein, limited to what is required for a better understanding of the present disclosure.

In some embodiments the hydraulic power recovery turbine can be a reversible pump and can be substantially identical to pump 5, except for the absence of a clutch at the drive end side of pump 5. The gearbox 13 is thus used to reverse the rotary speed of the input shaft 13A and output shaft 13B, so that both hydraulic machines 5 and 23 rotate in the correct direction.

In some embodiments the hydraulic power recovery turbine 23 comprises an outer casing 37, wherein a rotor 39 is arranged. The rotor is usually comprised of one or more impellers 41. In the embodiment shown in FIG. 3, a multi-stage hydraulic power recovery turbine 23 is shown, comprised of ten impellers 41 mounted on a common rotor shaft 43 in a so-called back-to-back configuration. Other impeller arrangements are possible, depending upon the design of the hydraulic power recovery turbine.

The rotor shaft 43 is supported by bearings housed in the drive-end side bearing housing 25 and in the non-drive end bearing housing 27. In some embodiments, the bearings can be journal bearings as illustrated in FIG. 3. A first journal bearing 45 is arranged in the drive end bearing housing 25 and a second journal bearing 47 is arranged in the non-drive end bearing housing 27. A thrust bearing, not shown, is also provided, usually in the non-drive end bearing housing 27. Different bearing arrangements can be provided, instead.

The drive end bearing housing 25 is illustrated in greater detail in FIG. 4. In some embodiments, the drive end bearing housing 25 can be comprised of a mounting flange 25F, by means of which the drive end bearing housing 25 is connected to a main body of casing 37.

In FIG. 4 a first end 43A of the rotor shaft 43 is shown, supported by bearing 45. The end 43A of rotor shaft 43 is mechanically connectable to the output shaft 29 of the hydraulic power recovery turbine 23 through a clutch 51.

In some embodiments the clutch 51 is an overrunning clutch designed and arranged for drivingly connecting the rotor shaft 43 to the output shaft 29 when the two shafts rotate at the same rotary speed, i.e. when the rotor shaft 43 rotates at the same speed as the electric motor shaft 15, which is torsionally constrained to the output shaft 29 through the shaft coupling 31.

As shown in FIG. 5, in some embodiments the overrunning clutch 51 is comprised of an outer race 51A and an inner race 51B. In some embodiments, the inner race 51B of the overrunning clutch 51 is mounted on the output shaft 29 and torsionally constrained thereto. The outer race 51A of the overrunning clutch 51 can be torsionally constrained to the rotor shaft 43 for rotation therewith as described here below.

In some embodiments, a shaft hub 53 is torsionally coupled to the end 43A of the rotor shaft 43 and to the outer race 51A of the overrunning clutch 51. The shaft hub 53 can be comprised of a cup-shaped flange 54 and a fixing ring 59. Through holes 53A are provided in the cup-shaped flange 54 and threaded holes 57 are provided in the fixing ring 59.

The overrunning clutch 51 can be connected to the shaft hub 53 by means of bolts 55 extending through holes 53A of the shaft hub 53 and through further holes 51C provided in the outer race 51A of the overrunning clutch 51. The bolts 55 are screwed into the threaded holes 57 provided in a fixing ring 59.

Two bearings 61 and 63 can be mounted inside the shaft hub 53. In some embodiments, the bearings 61 and 63 are rolling bearings, for example ball bearings. The two bearings 61 and 63 are arranged on opposite sides of the overrunning clutch 51. The two bearings 61 and 63 can be mounted on the output shaft 29 and the outer races thereof can be engaged with the cup-shaped flange 54 and with the fixing ring 59, respectively, in order to ensure mechanical concentricity between the two races 51A and 51B of the overrunning clutch 51.

In other embodiments, not shown, the inner race of the overrunning clutch 51 can be torsionally constrained to the output shaft 29 and the outer race of the overrunning clutch 51 can be torsionally constrained to the rotor shaft, the shaft hub 53 being mounted on the output shaft 29 and the bearings 61, 63 being mounted on the rotor shaft 43.

The drive end bearing housing 25, therefore, houses both the bearing 45 supporting the rotor shaft 43 of the hydraulic power recovery turbine, as well as the overrunning clutch 51 and the shaft hub 53 connecting the end 43A of rotor shaft 43 to the output shaft 29.

This arrangement results in a shorter length of the overall system 1 with respect to the current art arrangement shown in FIG. 1, as can be best appreciated comparing FIGS. 1 and 2. The overrunning clutch 51 of the arrangement shown in FIG. 2 is in fact housed within the drive end bearing housing 25 and does not require separate mounting on the baseplate 3, as instead provided for in the embodiment of FIG. 1. Moreover, one of the two shaft couplings 119, 121 required in the arrangement of FIG. 1 is dispensed with, since only one shaft coupling 31 is now required between the output shaft 29 of the hydraulic power recovery turbine and the electric motor shaft 15.

The operation of the system is as follows. When a fluid flow through the hydraulic circuit connected to the input manifold 33 and the output manifold 35 of the hydraulic power recovery turbine 23 is available, the flow is processed through the hydraulic power recovery turbine 23 so that the rotor shaft 43 thereof is put into rotation. The electric motor 11 drives into rotation the rotary equipment 5 and, being connected through the shaft coupling 31 to the output shaft 39, the electric motor 11 also drives into rotation the output shaft 29 at the same rotary speed. The two shafts 43 and 29 are torsionally disconnected by the interposed overrunning clutch 51 as far as the rotary speed of the rotor shaft 43 is lower than the rotary speed of the output shaft 29. Once the rotor shaft 43 reaches the rotary speed of the output shaft 29, the overrunning clutch 51 automatically engages and mechanical power generated by the hydraulic power recovery turbine is transmitted from the rotor shaft 43 through the overrunning clutch 51, the output shaft 29 and the shaft coupling 31 to the electric motor shaft 15, so that the electric power absorbed by the electric motor 11 for rotating the rotary equipment 5 is reduced and the overall efficiency of the system 1 is increased.

In the arrangement of FIG. 2 the hydraulic power recovery turbine 23 is connected to the main driver, e.g. the electric motor 11. In other embodiments, not shown, the hydraulic power recovery turbine can be directly connected to the rotary equipment 5, e.g. a centrifugal pump. In this case the hydraulic power recovery turbine 23 will provide power to the rotary equipment 5 when it rotates at the same rotary speed as the rotary equipment.

In yet further embodiments, the main driver can be omitted and the rotary equipment will then be driven into rotation entirely by the hydraulic power recovery turbine when power from a fluid flow is available.

If now fluid flows through the hydraulic power recovery turbine, or if insufficient flow is available, so that the hydraulic power recovery turbine 23 cannot reach the required rotary speed, the overrunning clutch 51 does not engage and the rotary equipment 5 is entirely powered by the electric motor 11. If the hydraulic power recovery turbine 23 is not running, shaft 43 is steady while shaft 29, connected to the main driver 15, is at running speed. The overrunning clutch 51 is disengaged and the speed differential between outer race 51A and inner race 51B of overrunning clutch 51 is sustained by the two bearings 61 and 63.

The hydraulic power recovery turbine 23 disclosed herein above can be used also in other configurations, e.g. to drive an electric generator or other auxiliaries or rotating equipment. The arrangement of the clutch in the drive-end bearing housing positively affects the overall footprint of the machinery arrangement.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A hydraulic power recovery turbine comprising:
   a casing;
   a rotor arranged for rotation in the casing and comprising a rotor shaft and at least one impeller mounted on the rotor shaft;
   at least one drive-end bearing housing comprising a mounting flange to connect the drive end bearing housing to the casing;
   at least one drive-end bearing arranged in the drive-end bearing housing to rotatingly support the rotor shaft;
   an output shaft extending from the at least one drive-end bearing housing;
   a clutch comprising an inner race and an outer race axially aligned by at least one pair of bearings; and
   a shaft hub comprising a cup-shaped flange housing a first bearing of the at least one pair of bearings, and a fixing ring constrained to the cup-shaped flange and housing a second bearing of the at least one pair of bearings, wherein the outer race of the clutch is constrained between the cup-shaped flange and the fixing ring and is tortionally constrained to the rotor shaft or the output shaft,
   wherein the clutch and the shaft hub are arranged in the at least one drive-end bearing housing and connect the rotor shaft to the output shaft.

2. The hydraulic power recovery turbine of claim 1, wherein the clutch is an overrunning clutch.

3. The hydraulic power recovery turbine of claim 1, further comprising a single lubrication system for lubricating the clutch and the drive-end bearing.

4. The hydraulic power recovery turbine of claim 1, wherein the outer race of the clutch is torsionally constrained to the rotor shaft and the inner race of the clutch is connected to the output shaft.

5. The hydraulic power recovery turbine of claim 1, wherein the inner race of the clutch is torsionally coupled to the output shaft and the outer race of the clutch is torsionally coupled to the rotor shaft.

6. The hydraulic power recovery turbine of claim 1, wherein the bearings of the at least one pair of bearings are rolling bearings.

7. The hydraulic power recovery turbine of claim 6, wherein each rolling bearing has a respective outer bearing race and a respective inner bearing race, the respective outer bearing race is mounted in the shaft hub and the respective inner bearing race is mounted on the rotor shaft or the output shaft.

8. The hydraulic power recovery turbine of claim 1, wherein the clutch is arranged between the at least one pair of bearings.

9. The hydraulic power recovery turbine of claim 1, wherein the cup-shaped flange is torsionally constrained to the rotor shaft of the hydraulic power recovery turbine.

10. The hydraulic power recovery turbine according to claim 1, wherein the outer race of the clutch is torsionally constrained to the rotor shaft and the inner race of the clutch is torsionally constrained to the output shaft.

11. A rotary equipment driving arrangement, the rotary equipment driving arrangement comprising:
 a rotary equipment; and
 a hydraulic power recovery turbine according to claim 1 arranged for providing power to drive the rotary equipment.

12. The arrangement of claim 11, further comprising a main driver, drivingly connected to the rotary equipment, wherein the hydraulic power recovery turbine provides supplemental power for driving the rotary equipment, thus reducing the power required from the main driver.

13. The arrangement of claim 12, wherein the main driver comprises an electric motor.

14. The arrangement of claim 12, further comprising a gear box arranged between the main driver and the rotary equipment.

15. The arrangement of claim 12, wherein the main driver comprises a driver shaft with a first end drivingly connected to the rotary equipment and a second end drivingly connected to the hydraulic power recovery turbine through the clutch of the hydraulic power recovery turbine.

16. The arrangement of claim 15, further comprising at least one first shaft coupling which connects the first end of the driver shaft to the rotary equipment and a second shaft coupling which connects the output shaft of the hydraulic power recovery turbine to the second end of the driver shaft.

\* \* \* \* \*